United States Patent
Joseph et al.

(10) Patent No.: US 12,367,209 B1
(45) Date of Patent: Jul. 22, 2025

(54) NON-INVASIVE INSTRUMENTATION AND MONITORING FOR MASSIVE PARALLEL PROCESSING ENVIRONMENT

(71) Applicant: Bank of America Corporation, Charlotte, NC (US)

(72) Inventors: Thomas Joseph, Old Bridge, NJ (US); Julien Gaupin, Atlanta, GA (US); Rajasekhar Reddy Chittela, Gilbert, AZ (US); Bisweswaray Panda, Telangana (IN); Sushmitha Ganesh Kadam, Thane (IN); Sheik Mohideen Shareef, Chennai (IN); Sahil Avinash Kalode, Pune (IN); Rajashekhar Gadicharla, Hyderabad (IN); Sandeep Chavan, Chesterbook, PA (US)

(73) Assignee: Bank of America Corporation, Charlotte, NC (US)

( * ) Notice: Subject to any disclaimer, the term of this patent is extended or adjusted under 35 U.S.C. 154(b) by 26 days.

(21) Appl. No.: 18/417,357

(22) Filed: Jan. 19, 2024

(51) Int. Cl.
*G06F 16/25* (2019.01)

(52) U.S. Cl.
CPC .................. *G06F 16/254* (2019.01)

(58) Field of Classification Search
None
See application file for complete search history.

(56) References Cited

U.S. PATENT DOCUMENTS

| | | | |
|---|---|---|---|
| 7,849,108 B1 | 12/2010 | Kapor | |
| 11,354,314 B2 | 6/2022 | Tiwari et al. | |
| 12,216,645 B1* | 2/2025 | Draese | G06F 16/2423 |
| 2019/0370263 A1 | 12/2019 | Nucci et al. | |
| 2020/0174966 A1 | 6/2020 | Szczepanik et al. | |
| 2020/0193057 A1 | 6/2020 | Yu et al. | |
| 2020/0272662 A1* | 8/2020 | Markovic | G06F 16/9024 |
| 2021/0232604 A1 | 7/2021 | Sundaram et al. | |
| 2021/0382897 A1* | 12/2021 | Potharaju | G06F 16/2471 |
| 2022/0053024 A1* | 2/2022 | Byron | G06F 16/285 |
| 2022/0414118 A1* | 12/2022 | Joseph | G06F 16/215 |

* cited by examiner

*Primary Examiner* — Son T Hoang
(74) *Attorney, Agent, or Firm* — Weiss & Arons LLP (57) ABSTRACT

A system and method for non-invasively monitoring and troubleshooting a massive parallel processing environment that may include a digital ecosystem having a data lake. The system may include a data transporter, a data ingester, a data chef, and a separate message producer at each of the data transporter, data ingester, and data chef. Log data from the message producers may be transmitted to a memory associated with a processor for organization of the log data by topic, such as a Kafka topic, into instrumentation data that may indicate performance of different portions of the system. The system may further include a message consumer, such as Kafka message consumer, to enable the presentation of the instrumentation data to be interactively displayed to a user on one or more electronic dashboards for monitoring and troubleshooting of performance issues.

20 Claims, 10 Drawing Sheets

Date Load Date: 2023-11-16  901

Summary

| Job | component_name | FAILURE | status null | SUCCESS | Grand Total |
|---|---|---|---|---|---|
| mtc-1.0 | datatransfer |  |  | 6 | 6 |
|  | dataingester |  |  | 6 | 6 |
|  | datachef |  |  | 4 | 4 |
|  | Total |  |  | 16 | 16 |
| om-1.0 | datatransfer | 1 |  | 37 | 38 |
|  | dataingester |  | 1 | 26 | 27 |
|  | datachef |  |  | 693 | 693 |
|  | Total | 1 | 1 | 756 | 758 |
| spp-1.0 | datatransfer | 1 |  | 61 | 62 |
|  | dataingester |  |  | 61 | 61 |
|  | datachef |  |  | 4 | 4 |
|  | Total | 1 |  | 126 | 127 |
| Grand Total |  | 2 | 1 | 898 | 901 |

FIG. 3

| 402 Date Load Date: | 404 2023-11-16 | 106 406 | 408 403 (All) |
|---|---|---|---|
| transport | source_file_name | | processed_file_size |
| bulkarchive | /ASAP/SPP/VendorFiles/END_OF_SPP_ARCHIVE_FEEDS_SFTPLOG | | 26,652 |
| cassandra | null | | Null |
| jdbc | null | | Null |
| null | null | | Null |
| postgresql.. | | | |
| sftp | /ASAP/MTC/STM923TA.TRADEDTL | | 2,350,769,112 |
| | /ASAP/MTC/STM924TA.DISCLDTL | | 5,767,029,102 |
| | /ASAP/MTC/STM925TA.PACKGDTL | | 238,899,300 |
| | /ASAP/MTC/STM927TA.BYPASSFL | | 54 |
| | /ASAP/MTC/STM927TA.SMPLBYPS | | 3,441 |
| | /ASAP/MTC/STM929TA.PMRTABLE | | 5,571,555 |
| | /ASAP/OM/GOMT_OPTIMAOMS_HOTS_DAILY.DAT | | 0 |
| | /ASAP/SPP/ExtractDataFile/SPP_TB_ASSET_APPROVAL.dat | | 919,798 |
| | /ASAP/SPP/ExtractDataFile/SPP_TB_ASSET_COMMENT.dat | | 31,964,896 |
| | /ASAP/SPP/ExtractDataFile/SPP_TB_ASSET_CORP_BOND.dat | | 91,505,217 |
| | /ASAP/SPP/ExtractDataFile/SPP_TB_ASSET_DIVIDEND.dat | | 89,153,847 |
| | /ASAP/SPP/ExtractDataFile/SPP_TB_ASSET_EQUITY.dat | | 47,500,810 |
| | /ASAP/SPP/ExtractDataFile/SPP_TB_ASSET_EXCLUDE.dat | | 870,531 |
| | /ASAP/SPP/ExtractDataFile/SPP_TB_ASSET_FILE_UPLOAD_DATA.dat | | 208,426 |
| | /ASAP/SPP/ExtractDataFile/SPP_TB_ASSET_FILE_UPLOAD.dat | | 4,383 |
| | /ASAP/SPP/ExtractDataFile/SPP_TB_ASSET_GOVT.dat | | 12,293,842 |
| | /ASAP/SPP/ExtractDataFile/SPP_TB_ASSET_ICE_INTL_ND.dat | | 2,994,057,740 |
| | /ASAP/SPP/ExtractDataFile/SPP_TB_ASSET_LINK.dat | | 251,875 |
| | /ASAP/SPP/ExtractDataFile/SPP_TB_ASSET_MBS.dat | | 835,618,445 |
| | /ASAP/SPP/ExtractDataFile/SPP_TB_ASSET_MUNI.dat | | 1,937,713,165 |

FIG. 4

| Date Load Date: | 2023-11-16 | 701 | (All) ▼ |
|---|---|---|---|
| target_table_name | no_of_records_ingested | | |
| MTC_DASHBOARD | 2,388,993 | | 1 |
| MTC_MIXED_SUPRESSION_RPT | 2,388,993 | | 1 |
| MTC_REPORT_DATE | 1 | | 1 |
| MTC_TRADE_SUMMARY_PKG | 2,388,993 | | 1 |
| OM_BASKETORDERS | 0 | | 2 |
| | 8 | | 1 |
| | 12 | | 1 |
| | 27 | | 1 |
| | 150 | | 1 |
| OM_FIXMESSAGES | 0 | | 29 |
| | 1 | | 9 |
| | 2 | | 3 |
| | 3 | | 3 |
| | 4 | | 3 |
| | 5 | | 2 |
| | 9 | | 1 |
| | 12 | | 1 |
| | 15 | | 1 |
| | 58 | | 1 |
| | 61 | | 1 |
| | 72 | | 3 |
| | 78 | | 1 |
| | 85 | | 1 |
| | 96 | | 1 |
| | 108 | | 1 |
| | 15,495 | | 1 |

FIG. 5

| Tabs | | 604 Full Data/1 row 54 fields | 606 | 608 | 610 | 612 |
|---|---|---|---|---|---|---|
| Summary | | Abt Custom SQL Query target_table_name | # Custom SQL Query no_of_records_ingested | Abc Custom SQL Query component_name | # Custom SQL Query Job | # Custom SQL Query recordcount |
| ☐ Full Data | | MTC_DASHBOARD | 2,388,993 | datachef | mtc-1.0 | 1 |

602 / 600

| 614 | 616 | 620 | 622 | ☑ Show Fields 624 |
|---|---|---|---|---|
| Abt Custom SQL Query app_id | Abt Custom SQL Query app_name | Abt Custom SQL Query archive_file_location | Abt Custom SQL Query cob_date | Abt Custom SQL Query created_by |
| application_1697964701318_ | mtc_datachef | null | 2023-11-15 | null |

NON-INVASIVE INSTRUMENTATION AND MONITORING FOR MASSIVE PARALLEL PROCESSING ENVIRONMENT

FIELD OF THE DISCLOSURE

Aspects of the disclosure relates to instrumentation and non-invasive monitoring and troubleshooting of a massive parallel processing environment using the instrumentation.

BACKGROUND OF THE DISCLOSURE

A massive parallel processing platform may be used to process massive amounts of data using an ecosystem that includes a data lake. Examples of a system and a method for standardizing data input, data output, and data manipulation at a data lake are described in U.S. Pat. Nos. 11,475,036 and 11,755,613 which are hereby incorporated by reference as if fully set forth herein in their respective entireties.

The distributive nature of massive parallel processing makes it difficult for a user or team of users that monitor and troubleshoot a massive parallel processing platform to capture and analyze the performance of platform components. Performance problems may lead to failure to transport or process some or all data. Currently, a great deal of time and effort is spent parsing through massive logfiles to curate the processed data to derive instrumentation matrixes that may be used for analysis and troubleshooting. If something does go wrong, the troubleshooting may require an invasive analysis of raw data to determine where the transport or processing failed. Moreover, the analysis and troubleshooting may have to wait until data is output to downstream end user applications to know whether there have been transmission or processing problems.

It would be desirable for a system and method that provides instrumentation and monitoring of a massive parallel processing platform that may enable a team to more quickly analyze and troubleshoot problems encountered on the platform, preferably in real time.

SUMMARY OF THE DISCLOSURE

It is an object of this invention to provide a system and method for generating and capturing instrumentation data and for monitoring a massive parallel processing environment.

A non-invasive system for monitoring and troubleshooting a massive parallel processing platform may be provided in accordance with principles of the disclosure. The system may include a data transporter, that may be executed on a processor coupled to a memory and may be operable to transport first data from data sources to an edge node at a data lake comprising interconnected information technology resources. The system may include a data ingester that may operate on the processor coupled to the memory and that may be operable to ingest second data output from the edge node before data elements of the ingested data are forwarded to the data lake. The system may include a first message producer located at the data transporter and operable to capture first log data generated by the data transporter and transmit the first log data from the data transporter to a memory to store, by topic, the captured first log data as a sequence of related events. The system may include a second message producer located at the data ingester and that may be operable to capture second log data generated by the data ingester and transmit the second log data from the data ingester to the memory to store, by topic, the captured second log data with the first log data. The system may include a message consumer in communication with the first and second message producers that may be operable to receive the first log data and the second log data to output instrumentation data that may indicate a real-time status of ongoing operations at the data transporter and the data ingester. The real-time status of ongoing operations at the data transporter and the data ingester may be used to monitor a real-time status of operations at the massive parallel processing platform. Each topic may be an Apache Kafka topic.

The data transporter may be operable to receive a seed file, the seed file comprising a list of data elements from the data sources and a data source location for each data element included in the list of data elements. The data transporter may be operable to parse the seed file into a plurality of data elements and associated data source locations. The data transporter may be operable to retrieve the plurality of data elements from the data source locations. The data transporter may be operable to transfer the retrieved data elements from the data source locations to the edge node at the data lake.

The data ingester may be operable to receive a schema configuration file for each of the data elements, the schema configuration file comprising field definitions, validation rules and mappings. The data ingester may be operable to convert a format of each of the data elements, located at the edge node at the data lake, from a native format to a data lake accessible format. The data ingester may be operable to store each of the converted data elements at one or more locations the data lake based on the schema configuration file.

The system may include a data chef that may operate on the processor coupled to the memory and that may be operable to transform each of the stored data elements into integrated, conformed data elements. The data chef may be operable to execute one or more recipes on each of the stored data elements. The one or more recipes may manipulate each of the data elements into consumable data elements that are specifically consumable by one or more downstream applications. The one or more recipes may be received from one or more downstream applications. The system may include a third message producer located at the data chef that may be operable to capture third log data for the data chef and transmit the third log data from the data chef to the memory to store, by topic, the third log data in addition to the first log data and the second log data. The message consumer may be operable to receive the third log data captured by the third message producer. The edge node, the data lake, the data ingester and the data chef may be located within a digital ecosystem comprising a Hadoop as a Service system.

The system may include a display that is operable to display one or more electronic dashboards for the user to monitor in real time a status of ongoing operations of the massive parallel processing platform based on the instrumentation data. The one or more electronic dashboards may display in real time performance-related metrics that enable the user to monitor a real-time status of ongoing operations of the massive parallel processing platform and to troubleshoot in real time to performance issues that are detected. The one or more electronic dashboards may include separate dashboards for each of the data transporter, the data ingester, and the data chef. The real-time status of the ongoing operations may indicate the success or failure of data transmission or exceptions as indicated by the first log data or the second log data.

The real-time status of the ongoing operations may be indicated by one or more of data load time, data load status, system performance compared to SLA (service level agreement) specifications, an SLA trend that shows an increase or decrease in system performance, or data growth.

A method for monitoring and troubleshooting a massive parallel processing platform non-invasively may be provided in accordance with the present disclosure. The method may include transporting first data from data sources to an edge node at a data lake using a data transporter. The data lake may include interconnected information technology resources. The method may include capturing, at a first message producer located at the data transporter, first log data generated by the data transporter as a first set of events. The method may include transmitting the first log data from the first message producer to a memory to store the captured first log data. The method may include ingesting second data output from the edge node at a data ingester before forwarding data elements of the ingested data to the data lake. The method may include capturing, using a second message producer located at the data ingester, second log data generated by the data ingester as a second set of events. The method may include transmitting the second log data from the second message producer to the memory to store the captured second log data. The method may include storing the first log data and second log data in the memory, by topic. The method may include receiving, at a message consumer, instrumentation data that indicates a real-time status of ongoing operations at the data transporter and the data ingester. The instrumentation data may be based on the first log data and the second log data. The method may include enabling interaction, by a user, with the instrumentation data to monitor and troubleshoot issues indicated by the instrumentation data. The topic may be an Apache Kafka topic.

The transporting of the first data from the data sources to the edge node may include receiving a seed file at the data transporter. The seed file may include a list of data elements and a data source location for each data element included in the list of data elements. The method may include parsing the seed file at the data transporter. The parsing may include separating the seed file into a plurality of data elements and data source locations. The method may include retrieving the plurality of data elements from the data source locations. The method may include transferring, by the data transporter, the retrieved data elements from the data source locations to the edge node at the data lake. The method may include the ingesting of the second data from the data sources to the edge node. The ingesting may include receiving, at the data ingester located at the data lake, a schema configuration file for each of the data elements. The ingesting may include converting, at the data ingester, a format of each of the data elements, located at the edge node at the data lake, from a native format to a data lake accessible format. The ingesting may include storing, by the data ingester, the data elements at one or more locations at the data lake based on the schema configuration file.

The method may include transforming, at a data chef, third data that is processed in the data lake into consumable data that is consumable by one or more downstream applications. The method may include capturing, by a third message producer located at the data chef, third log data for the data chef that indicates a status of operations at the data chef. The method may include transmitting the third log data generated by the data chef to the memory to store by topic the third log data with the first and second log data. The instrumentation data that is received, at the message consumer, may be further based on the third log data.

The edge node, the data lake, the data ingester and the data chef may be located within a digital ecosystem that includes a Hadoop as a Service system.

The method may include outputting for display on one or more electronic dashboards in real time a status of ongoing operations of the massive parallel processing platform based on the instrumentation data. One or more electronic dashboards may include separate dashboards for each of the data transporter, the data ingester, and the data chef. One or more electronic dashboards may display in real-time performance-related metrics that enable the user to monitor a real-time status of ongoing operations of the massive parallel processing platform and to troubleshoot in real time to performance issues that are detected. The real-time status of the ongoing operations may indicate the success or failure of data transmission or exceptions as indicated by the first and second log data. The real-time status of the ongoing operations may indicate data load time, data load status, system performance compared to SLA (service level agreement) specifications, an SLA trend that shows an increase or decrease in system performance, or data growth.

A non-invasive system and method for monitoring and troubleshooting a massive parallel processing platform in accordance with principles of the disclosure may include one or more of a data transporter, a data ingester, or a data chef. A separate message producer may be included at one or more of the one or more of the data transporter, the data ingester, or the data chef. Each message producer may transmit its log data to a memory to organize the data by topic. The data may then be transmitted to a message consumer where it may be collected and used as instrumentation data for inclusion in one or more electronic dashboards that may be used to monitor and troubleshoot the massive parallel processing platform.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

The present disclosure relates to systems and methods for generating and capturing instrumentation data and for monitoring a massive parallel processing environment.

A system may capture, analyze, and report log data that includes a log of runtime information at multiple locations in a massive parallel processing platform that provides the massive parallel processing environment. The platform may include a data lake. The data lake may be a data lake within an open-source framework that stores and processes large datasets. The data lake may be a Hadoop data lake in a Hadoop®-as-a-service ("HaaS") ecosystem. The Hadoop data lake environment may be operable to independently handle data by line of business (LOB) or by application domain where there are multiple LOBs or application domains. An example of an LOB may be processing of banking transactions. The Hadoop data lake environment may be operable to provide support data discovery and analytics holistically along with data governance.

The system and method may capture log data for analysis at different locations at the platform. For example, log data may be captured at a data transporter for transporting data from data sources to an ecosystem that includes the data lake, and at a data ingester within the ecosystem for ingesting data to be stored at the data lake. Log data may also be captured at a data chef within the data lake that manipulates data into a format for consumption by one or more downstream applications.

The log data may be used as instrumentation data or may be used for generating instrumentation data that enables a user or team of users to monitor the system and have real-time visibility into system operations, including the success or failure of the data flow. The log data may be used to perform data analytics for proactive issue detection, effective troubleshooting to ensure stability, performance, and reliability of the platform, and data governance. The real-time platform monitoring may allow the user or team of users to be alerted immediately to a data processing failure at different stages of processing data. The capture of the log data may be performed non-invasively without interfering with the current processes being performed on the data from the data sources in the massive parallel processing environment.

The log data generated by platform components may thus be captured, analyzed and reported by platform components to enable real-time visibility into system operations, proactive issue detection, and effective troubleshooting to ensure stability, performance and reliability of the ecosystem.

In embodiments, the system and method may leverage Apache Kafka as an information messaging bus. Each of multiple platform components, such as the data transporter, the data ingester, and the data chef, may be operable to continually output log information and other relevant information. A Kafka message producer at each of the data transporter, data ingester, and the data chef, may be operable to act as an agent that captures the output log information and other relevant information at the various components and transmits that information to a Kafka topic. A Kafka message consumer may be operable to ingest the streamed information for the Kafka topic that has been captured from the message producers and generate an instrumentation table in real-time that a platform team may view on one or more dashboards. Real time alerts may be set up to provide alerts for specific conditions, such as failures or exceptions. A topic may be, for example, matters relating to an LOB In addition to monitoring the success or failure of data transmissions, some examples of performance criteria that may be monitored in real time using the system and method are data load time, data load status, whether system performance continues to be provided pursuant to the SLA (service level agreement), any SLA trend that shows an increase or decrease in system performance, and data growth.

Illustrative embodiments of methods, systems, and apparatus in accordance with the principles of the invention will now be described with reference to the accompanying drawings, which form a part hereof. It is to be understood that other embodiments may be used, and structural, functional, and procedural modifications may be made without departing from the scope and spirit of the present invention.

The drawings show illustrative features of methods, systems, and apparatus in accordance with the principles of the invention. The features are illustrated in the context of selected embodiments. It will be understood that features shown in connection with one of the embodiments may be practiced in accordance with the principles of the invention along with features shown in connection with another of the embodiments.

The methods, apparatus, computer program products, and systems described herein are illustrative and may involve some or all the steps of the illustrative methods and/or some or all of the features of the illustrative system or apparatus. The steps of the methods may be performed in an order other than the order shown or described herein. Some embodiments may omit steps shown or described in connection with the illustrative methods. Some embodiments may include steps that are not shown or described in connection with the illustrative methods, but rather are shown or described in a different portion of the specification.

Figure 1:
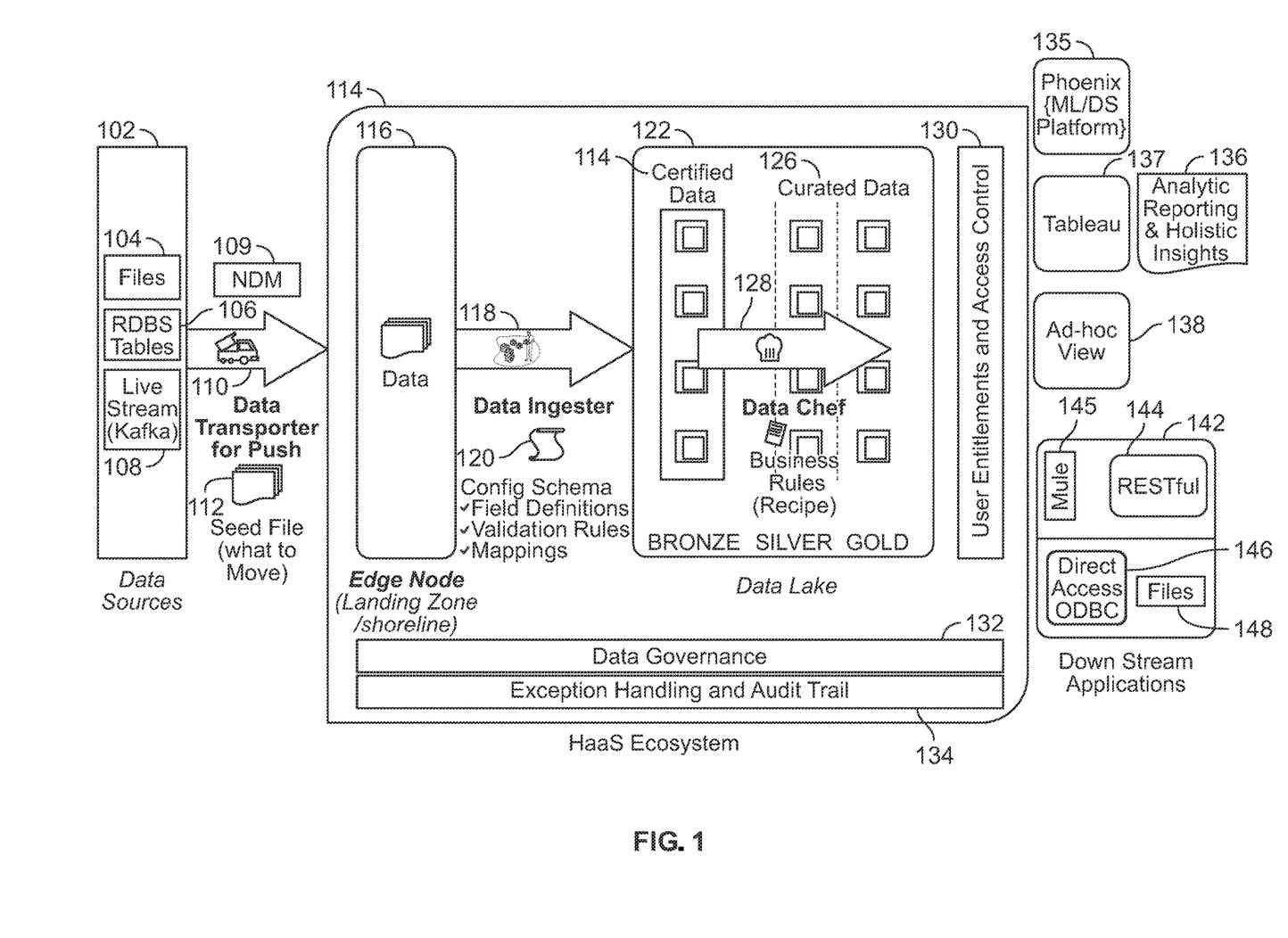
FIG. 1 shows an illustrative example of a prior art system architecture that may be included within a massive parallel processing platform.

FIG. 1 shows an illustrative example of a prior art system architecture that may be included within a massive parallel processing platform. The system architecture may include an Apache Hadoop-as-a-service architecture that may be implemented on a Hadoop server cluster for massive parallel processing.

In the system of FIG. 1, data may originate at various sources. Data sources 102 may include files 104, relational database ("RDBS") tables 106 and live streams 108. Live streams 108 may include streams from an Apache Kafka streaming platform.

The data may be transported from the data sources 102 to HaaS ecosystem 114. Data transporter 110 may transport the data from data sources 102 to HaaS ecosystem 114. Seed file 112 may communicate to data transporter 110 what data to move from which data source. Seed file 112 may be an input file that includes a list of data sources. Each line of the input file may include a different data source. There may be multiple seed files. Each seed file may identify data located in a file, an RDBS table or a live stream. A Network Data Mover (NDM) 109, which may transfer files between mainframe computers and/or midrange computers, may also transport data to HaaS ecosystem 114.

Data transporter 110 may transport the data to a landing zone within HaaS ecosystem 114. Edge node 116 may be a landing zone, also referred to as a shoreline. Edge node 116 may receive data from various data sources. It should be appreciated that the data included in edge node 116 may be raw data, as received from the various data sources.

Data ingester 118 may retrieve the raw data from edge node 116. As shown at 120, data ingester 118 may configure the schema for the data. Such configuration may include field definitions, validation rules and mapping. After configuration by data ingester 118, the data may be defined as certified data 124. Certified data 124 may also be referred to as bronze data. Certified data 124 may be included in data lake 122.

Data chef 128 may process certified data 124. Pursuant thereto, data chef 128 may execute one or more business rules (recipes) on certified data 124. The processed data may be referred to as curated data 126. Curated data 126 may also be referred to as silver data or gold data. Curated data 126 may also be included within data lake 122. Silver data may refer to data that has been processed using default processing, and gold data may refer to data that has been processed using end-user specific processing. As such, silver data may be transferred. However, silver data may typically not be transformed to be specific to the needs of an end user. Gold data, on the other hand, may be customized for an end user.

Data governance 132 shows a process for managing availability, usability, integrity and security of the data while the data is located within Haas ecosystem 114. Exception handling and audit trail 134 show a process for managing exceptions and data anomalies as well as maintaining records of data movement within Haas ecosystem 114.

User entitlements and access control 130 may be included in HaaS ecosystem 114. User entitlements and access control 130 may serve as a gateway between Haas Ecosystem 114 and downstream applications. As such, user entitlements and access control 130 may restrict access to the data included in data lake 122 based on the end user entitlements.

Downstream applications for Haas ecosystem 114 may include one or more of Phoenix (ML/DS) Platform 135, such as for managing AI, analytic reporting and holistic insights 136, a data analytics platform 137, such as Tableau from Salesforce, technology users and ad hoc viewing users 138, operational systems 140, or other downstream applications 142.

Other downstream applications 142 may include one or more of various applications. The applications may be management console applications, such as mule 145. The applications may be representational state transfer (RESTful) applications, shown at 144. The applications may be direct access open database connectivity (ODBC) applications, shown at 146.

Mule 145 may be an enterprise service bus (ESB) and integration framework that centralizes and monitors functions for enterprise service bus (ESB) deployments. Applications that follow the mule framework may access and utilize the data included in data lake 122.

RESTful applications 144 may be applications that follow representational state transfer standard. The RESTful approach may establish that requesting information about a resource state may be similar to invoking a uniform resource locator (URL). As such, an application programming interface (API) exposed from a RESTful application may be presented in a secure, uniform and stateless manner to a calling client. Applications that follow RESTful standard may access and utilize the data included in data lake 122.

ODBC may be a specification for a database API for accessing database management systems. Applications that follow an ODBC specification may access and utilize the data included in data lake 122.

Therefore, it may be difficult for a team to monitor and troubleshoot a massive parallel processing platform where one has to wait until data is output to end user applications to know whether data from data sources 102 has been successfully transmitted and processed by the massive parallel processing platform.

Figure 2:
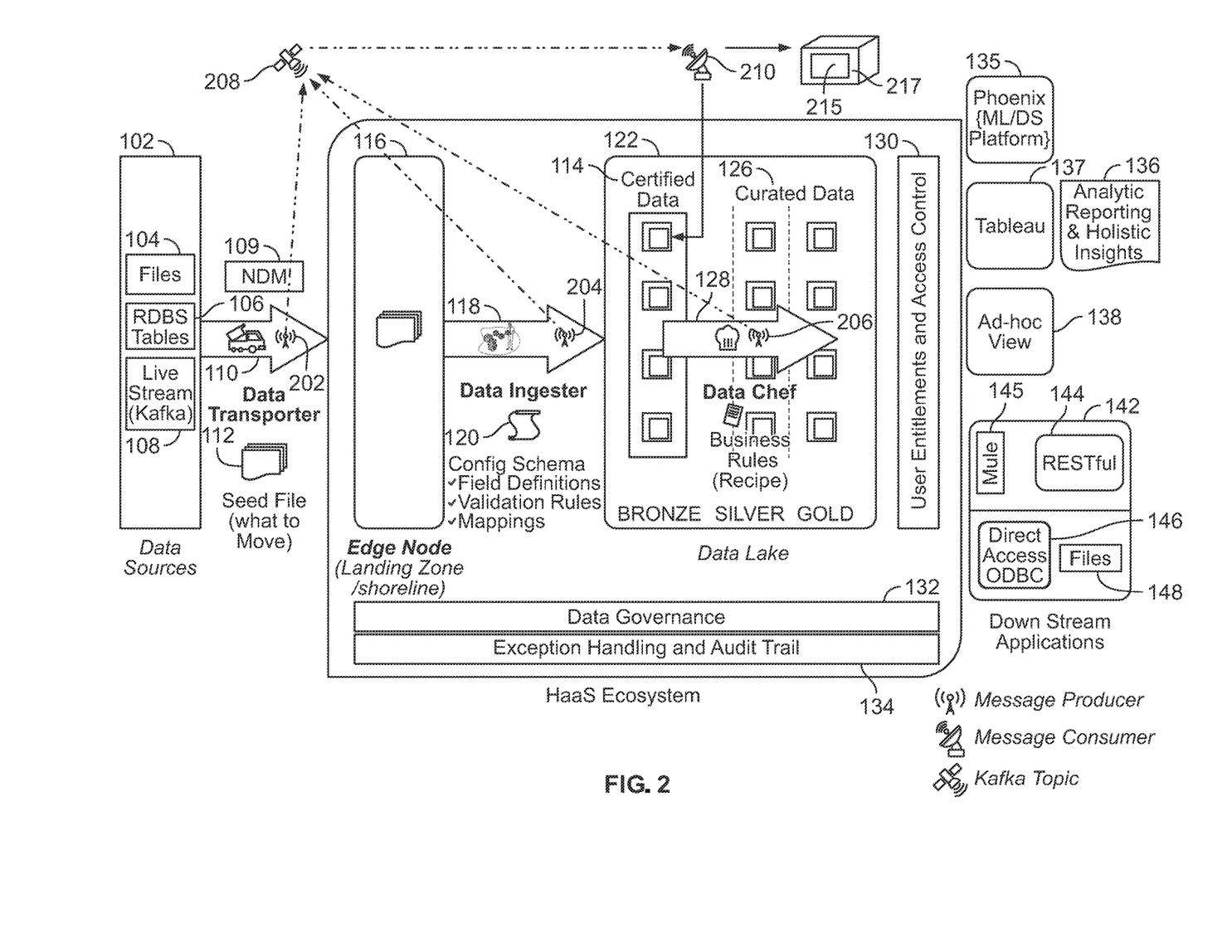
FIG. 2 shows an illustrative example of a system architecture that may be included within a massive parallel processing platform having non-invasive instrumentation and monitoring components in accordance with the disclosure.

FIG. 2 shows an illustrative example of elements that may be added to a system architecture that may be included in a massive parallel processing platform in accordance with the disclosure to enable non-invasive instrumentation and monitoring of the platform. These elements may be operable to capture log data for analysis at different locations in the platform. For example, log data may be generated at data transporter 110 for transporting data from data sources to an ecosystem that includes the data lake, and at data ingester 118 within the ecosystem for ingesting data to be stored at the data lake. Log data may also be generated at data chef 128 within the data lake that manipulates data into for consumption by one or more downstream applications.

The log data may be captured and monitored in real-time. Instrumentation data may be based on the log data and may be used to enable the team to have real-time visibility into the success or failure of the data flow, and the log data may be used to perform data analytics for proactive issue detection, effective troubleshooting to ensure stability, performance, and reliability of the platform, and data governance. The real-time platform monitoring may allow the team to be alerted immediately to a data processing failure at different stages of processing data. The capture of the log data may be performed non-invasively without interfering with the current processes being performed on the data from the data sources in the massive parallel processing environment.

The added elements may capture the log data at different locations before or within a digital ecosystem. Elements within the digital ecosystem may be located between an edge node and a data lake or within the data lake. The additional elements may include one or more message producers. A message producer 202 may be located at data transporter 110, a message producer 204 may be located at with data ingester 118, and a message producer 206 may be located at data chef 128. First log data generated by the data transporter may be captured by message producer 202. Second log data generated by the data transporter may be captured by message producer 204. Third log data generated by data chef 128 may be captured by message producer 206. The first, second, and third log data may indicate performance-related metrics. Message producers 202, 204, 206 may be Kafka message producers that may be compliant with the Apache Kafka platform.

One or more message consumers 210 may also be added to obtain data, by topic, from the message producers 202, 204, 206. A message consumer 210 may be a Kafka message consumer. Message consumer 210 may be located outside of data lake 122. Message consumer 210 may be in communication with data lake 122 and may provide the compiled information to an element in data lake 122 or may provide the information to an electronic device that may be located outside of data lake 122 where it may be presented to a user for monitoring and troubleshooting of performance issues.

A collection of log data may be captured from message producers 202, 204, 206 and organized by topic, for example by Kafka topic, at an electronic device that includes a memory 208, a processor, a communication interface and other components such as described below with reference to FIGS. 9 and 10. The data obtained from message producers 202, 204, 206 may be organized into instrumentation data by a processor associated with memory 208 and provided to message consumer 210 or message consumer 210 may be operable to ingest the streamed information for the Kafka topic that has been captured from the message producers and generate instrumentation data in real time. The instrumentation data may be organizable in one or more tables and may be viewable by a user or team member on one or more electronic dashboards.

The electronic dashboards may display instrumentation data on a display 215 of a device 217, such as a computer, mobile phone, tablet, or other electronic device. The instrumentation data may be organized by Kafka topic. The displayed instrumentation data may display in real-time performance-related metrics based on the log data that is captured by the message producers, organized by topic, and received by the message consumer. The instrumentation data may enable a user or team member to monitor a real-time status of ongoing operations of the massive parallel processing platform, to detect issues that may arise, and to troubleshoot, in real time, issues, such as performance issues, for quicker resolutions of the issues. The real-time status of the ongoing operations may indicate the success or failure of data transmission or exceptions as indicated by the first, second, and third log data. The real-time status of the ongoing operations may be indicated by log data that may include, for example, a data load time, a data load status, system performance compared to SLA (service level agreement) specifications, an SLA trend that shows an increase or decrease in system performance, or data growth.

Message consumer 210 may transmit the data to data lake 122 for certification and curation. Real time alerts may be set up to provide alerts for specific conditions, such as failures or exceptions.

Message producers 202, 204, 206, message consumer 210, and memory 208 may communicate using one or more of different types of communication systems. For example, communications may take place via a wide area network (WAN), a mobile communications network, by satellite, or by other communications systems. A processor may be associated with memory 208. The processor associated with memory 208 may compile log data by topic at memory 208.

By collecting and monitoring data from different locations in the system during the processing of the data, the analysis of the massive parallel processing platform may occur much more quickly.

Figure 3:
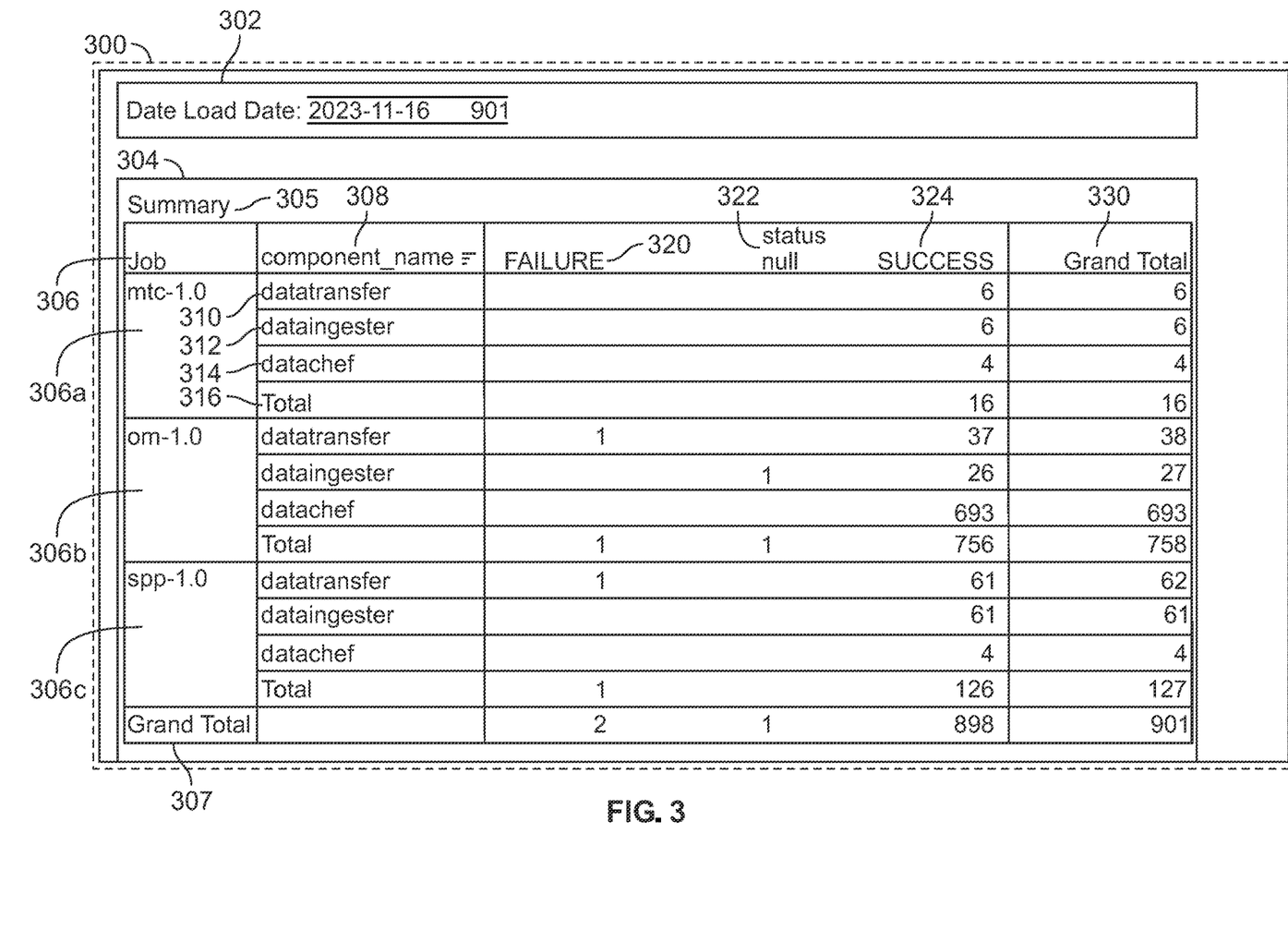
FIG. 3 shows an illustrative instrumentation summary dashboard in accordance with the disclosure.

FIG. 3 shows an illustrative instrumentation summary electronic dashboard 300. Data that is received at message consumer 210 may be displayed on dashboard 300 in a table format or some other format. Instrumentation summary dashboard 300 may include a date field 302 and may include a time. Display 215 may be operable to display a table 304 below data field 302 which an analyst may use for analysis and troubleshooting in accordance with the disclosure.

Table 304 may include summary information 305 compiled for the locations in the platform that are being monitored. A first column 306 may list the names of the jobs 306a, 306b, 306c that are being processed by the HaaS. For each job, performance-related information that may be captured by respective message producers at data transporter 110, data ingester 118, and data chef 128 and may be displayed in rows and columns as shown. For example, for job mtc-1.0, there may be a first row 310 for data transfer of data that passes through data transporter 110, a second row 312 for data ingestion at data ingester 118, and a third row 314 for data chef 128. A fourth row 316 may be provided for each job to show total performance values for that job. Row 307 may include grand totals of failures, status null, success, and total jobs.

Columns of information that may be provided for each job may include a number of failures column 320, a status null column 322, and a success column 324. A grand total column 330 may display a grand total, by row, of all of the detected failures, status nulls, and successes as well as a grand total of detected jobs.

Figure 4:
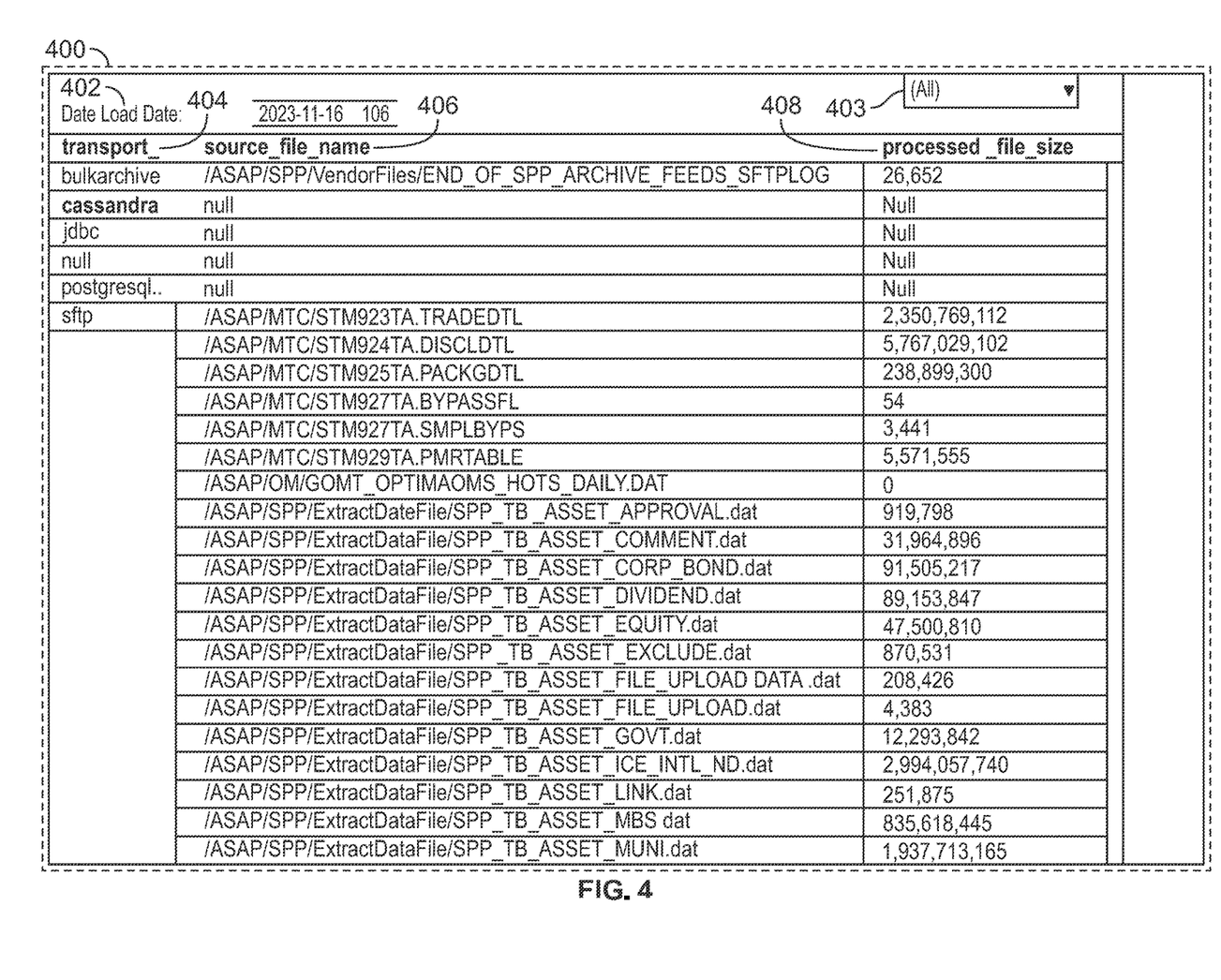
FIG. 4 shows an illustrative instrumentation data transporter dashboard in accordance with the disclosure.

FIG. 4 shows an illustrative instrumentation data transporter-specific electronic dashboard 400 in accordance with the disclosure. The dashboard may be selected from a pulldown menu 403 of available dashboards. Dashboard 400 may include a date and may include a time. Column 404 may indicate names of transport jobs, and column 406 may indicate a source file name for each source file. Some jobs may have a single source file and some jobs may have multiple source files as shown. Column 408 may show a processed file size for each of the files that were transported through data transporter 110. A similar dashboard may be provided for data ingester 118.

Figure 5:
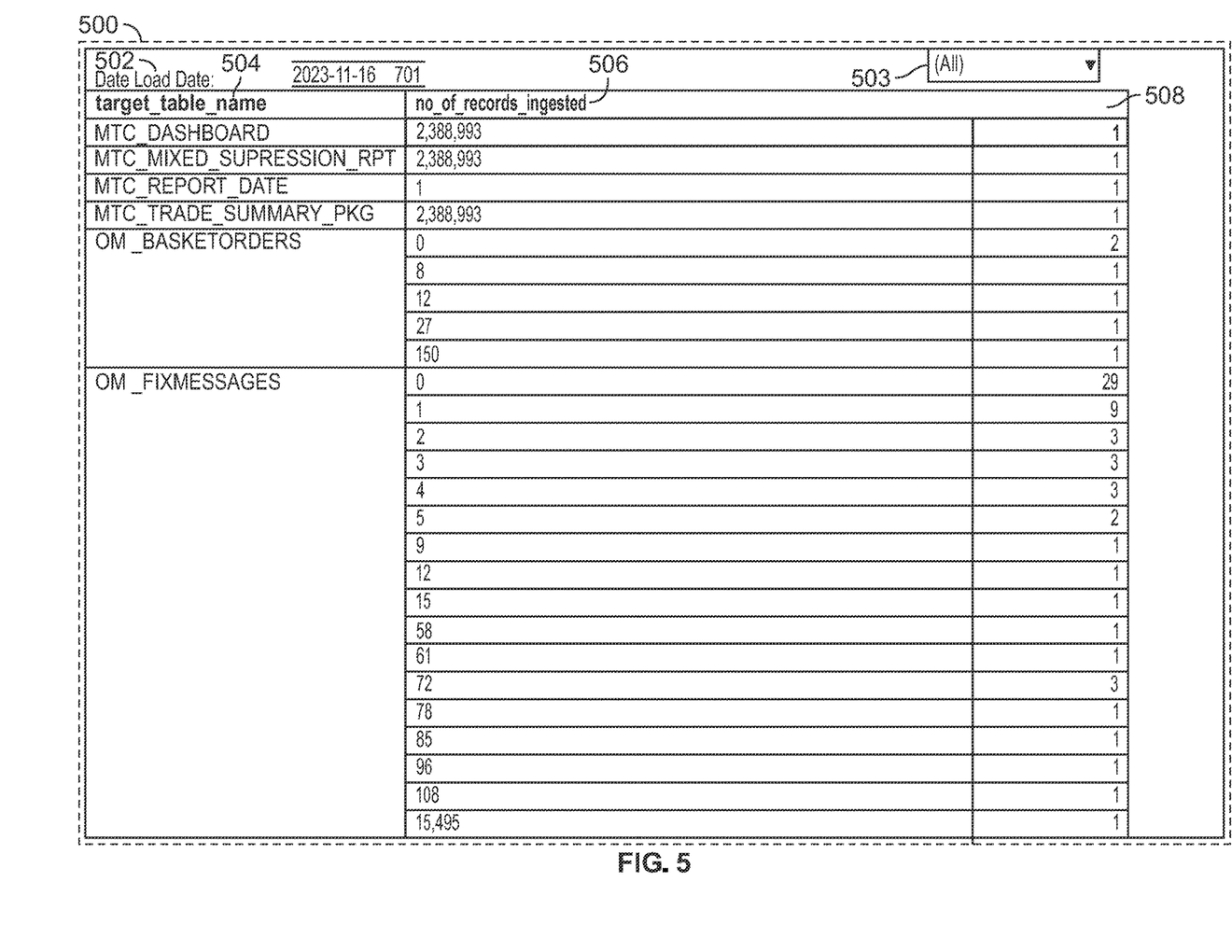
FIG. 5 shows an illustrative instrumentation data ingester dashboard in accordance with the disclosure.

FIG. 5 shows an illustrative instrumentation data chef-specific electronic dashboard 500 in accordance with the disclosure. The dashboard may be selected from a pulldown menu 503 of available dashboards. Dashboard 500 may include a date and may include a time. A first column may indicate a target table name that was processed by data chef 128. A second column 506 may indicate the number of records that were successfully ingested for each target table name. A third column 508 may indicate the number of records that were unsuccessfully ingested.

Figure 6:
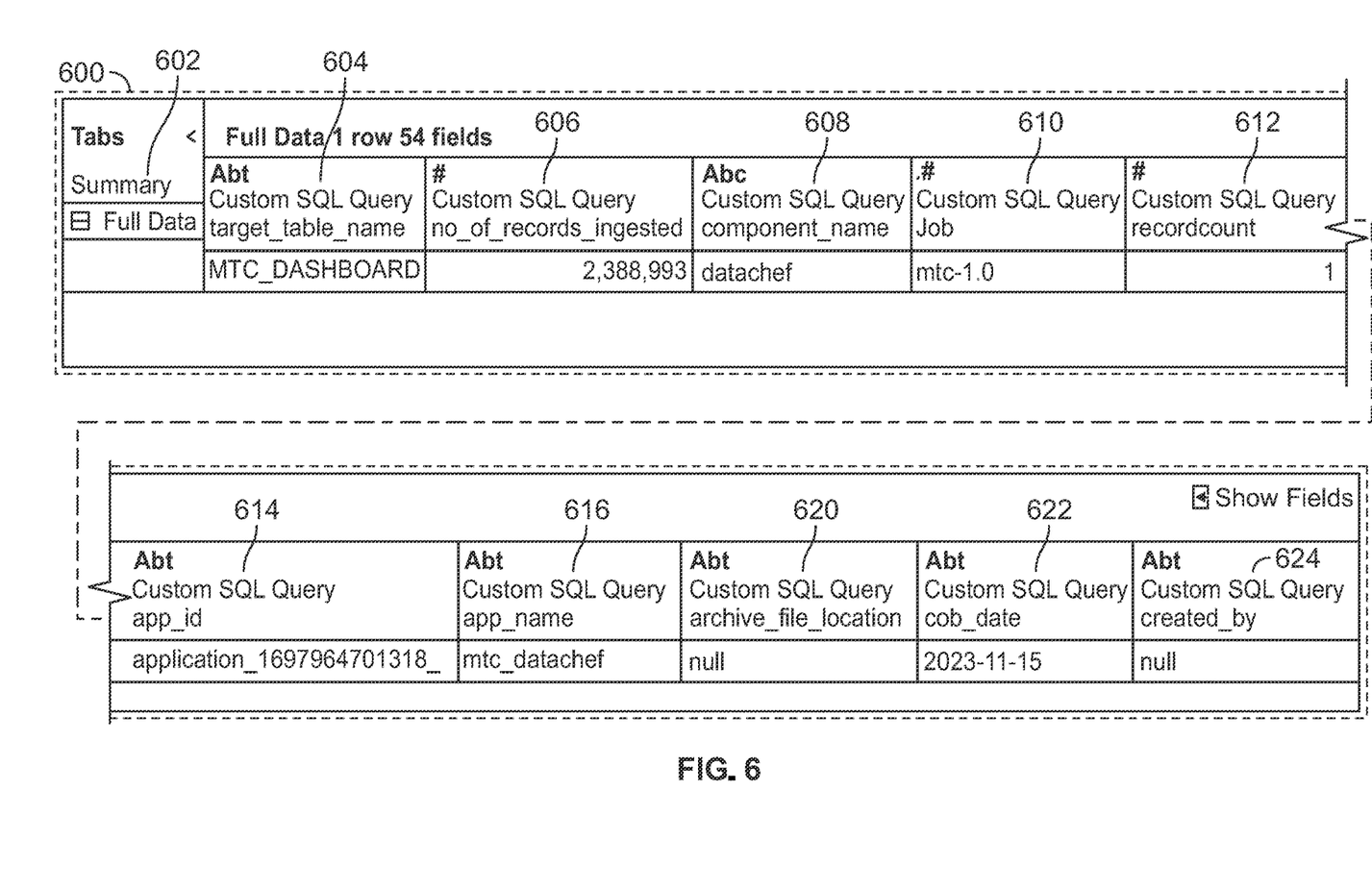
FIG. 6 shows an illustrative more detailed drill down view of a selection in the instrumentation data ingester dashboard in accordance with the disclosure.

A user may drill down for more information in the various tables by clicking on a particular row. FIG. 6 shows an illustrative example in which a user may drill down in the first row instrumentation data chef dashboard 500 of FIG. 5 by clicking on the row labeled "MTC_DASHBOARD" in column 504 to show table 600. Column 602 may indicate that a full or fuller set of data corresponding to MTC_DASHBOARD is provided. For example, table 600 may include 54 fields of data. These fields may include table name 604, number of records ingested 606, component name 608, job ID mtc-1.0 610, record count 612, application id 614, application name 616, archive file location 620, close of business ("cob") date 622, and a "created by" field 624.

Figure 7:
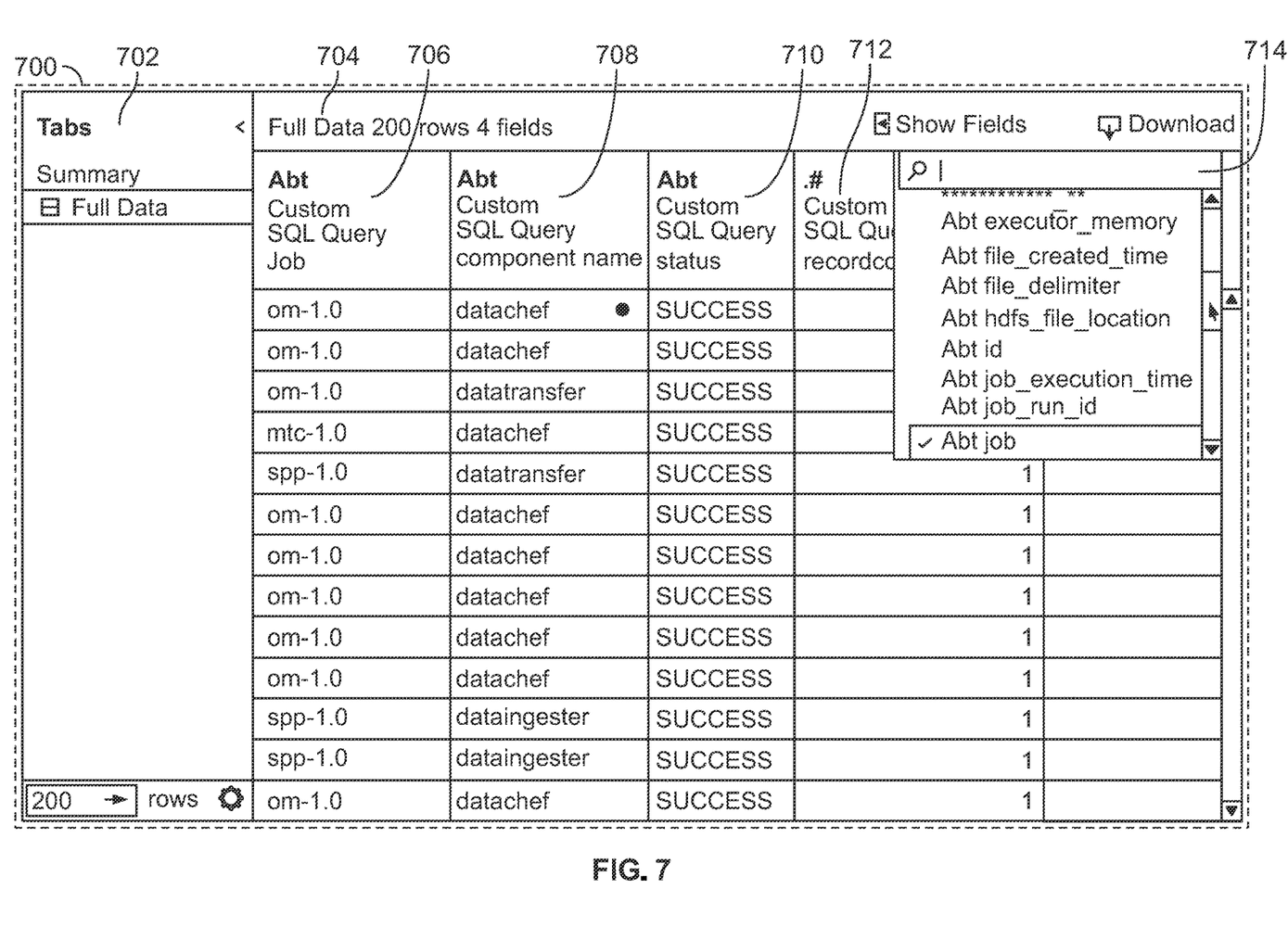
FIG. 7 shows an illustrative full data view of an instrumentation dashboard in accordance with the disclosure.

FIG. 7 shows an illustrative full data view of another instrumentation dashboard that may include a table 700 in accordance with the disclosure. A user may click on column heading Custom SQL Query Job 610 to display table 700. Table 700 may indicate at 702 that a full set of data for Custom SQL Query Job may be obtained for different jobs listed in column 706. Table 700 may indicate at 704 that full data for Custom SQL Query Job may include 200 rows and 4 fields. Column 708 may indicate the component name, such as datatransfer, dataingester, or datachef, for which data is provided in the respective row. Field 710 may indicate the status of the job, such as whether or not the job was successful. Other columns, such as column 712, may indicate additional information. A search field 714 may enable searching for one or more fields of instrumentation data that may be available for review, such as by use of a pull down menu, as illustrated.

The addition of message customers and message producers and compiling information by topic therefore enables non-invasive monitoring and quicker troubleshooting and response times rather than waiting for data to pass through the entire system of FIG. 2 to find out about a data transport, ingesting, or other processing failure just before the data reaches the downstream applications and having to invasively search through data records to identify the source of the failure.

Figure 8:
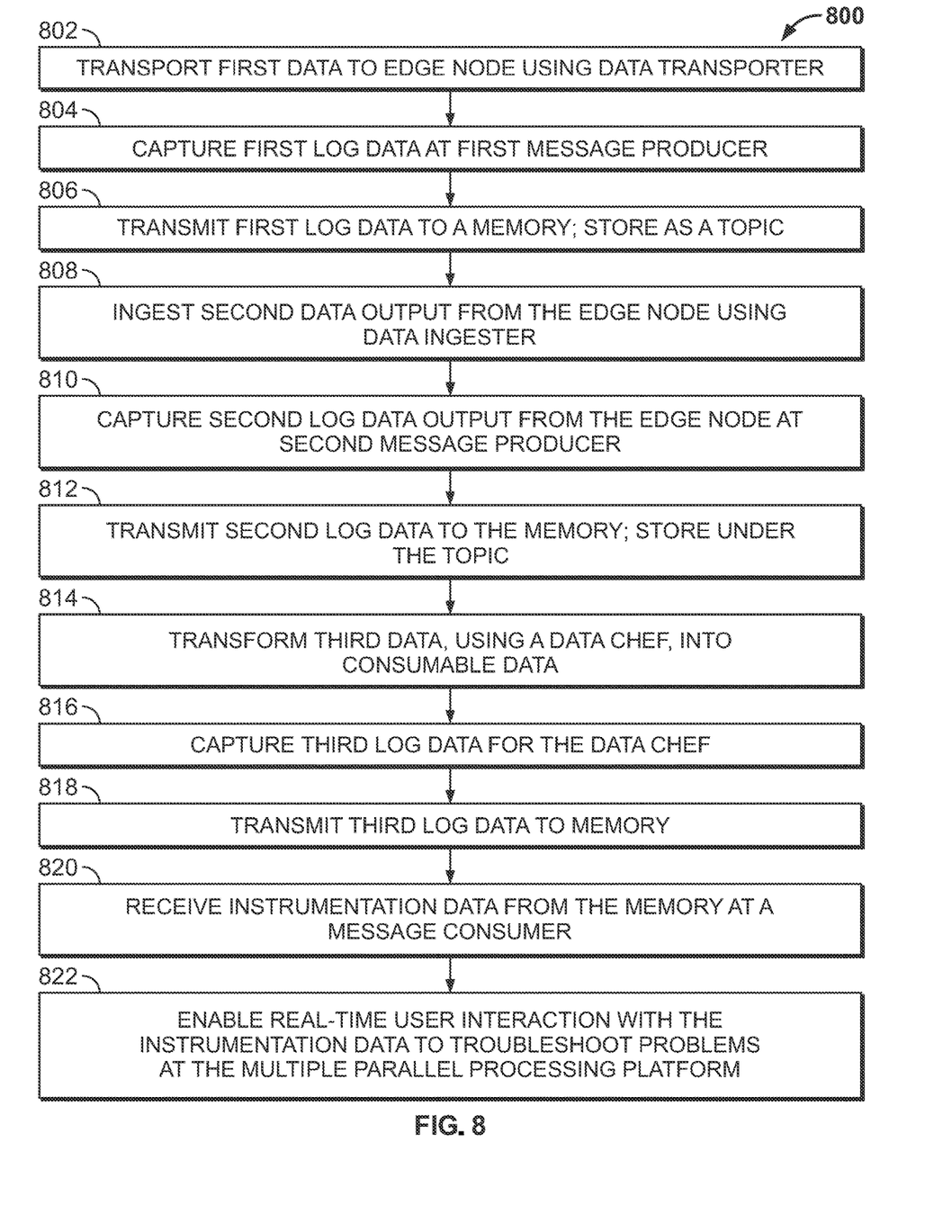
FIG. 8 shows an illustrative example of a flow chart of a method for providing non-invasive monitoring and instrumentation for a massive parallel processing environment that may be performed in accordance with principles of the disclosure.

FIG. 8 shows an illustrative example of a flow chart 800 for a method for monitoring a massive parallel processing platform non-invasively.

At step 802, first data may be transported from data sources to an edge node at a data lake using a data transporter. The data lake may include interconnected information technology resources. Data transporter may be operable to generate and output first log data that provides information about successful and unsuccessful transport of data. A first message producer, such as a Kafka message producer, may be located at the data transporter. At step 804, the first message producer may capture the first log data generated by the data transporter as a first set of events. At step 806, the first log data may be transmitted from the data transporter to a memory to store the captured first log data. The memory may store the first log data by topic, such as by a series of events categorized under a Kafka topic. The topic under which the log data is categorized may be associated with a particular indicator in the log data, such as, for example, an indicator of a line of business, or by transaction.

At step 808, a data ingester may ingest second data output from the edge node before forwarding data elements of the ingested data to the data lake. The data ingester may be operable to output second log data that provides information about successful and unsuccessful ingestion of data. At step 810, a second message producer that may be located at the data ingester may capture the second log data generated by the data ingester as a second set of events. At step 812, the second log data may be transmitted from the data ingester to the memory to store the captured second log data by topic. The topic may be the same topic that was used to categorize the first log data. The second log data may be stored in the memory by topic for storage and processing.

The data lake may also include a data chef. At step 814, data may be transformed by the data chef into consumable data in formats that may be consumed by downstream applications. Data chef may generate third log data. At step 816, the third log data may be captured by a third message producer from the data chef. At step 818, the third log data may be transmitted to the memory for storage at the memory by topic.

At step 820, a message consumer, such as a Kafka message consumer, may receive instrumentation data that has been stored by topic at the memory. The instrumentation data may indicate a real-time status of ongoing operations at the data transporter and the data ingester, and may include instrumentation data for the data chef. The instrumentation data may be data that is based on the log data that has been stored by topic at the memory. A processor associated with the memory may use the first, second, and third log data as instrumentation data or may reorganize the log data into the instrumentation data that may be viewed by a user, or the message consumer may receive the data stored by topic at the memory and organize the data into instrumentation data. Data may be transmitted from the memory to the message consumer periodically or may be transmitted to the message consumer upon request.

At step 822, the method may enable real-time user interaction with the instrumentation data to monitor and troubleshoot issues that may be indicated by the instrumentation data.

Figure 9:
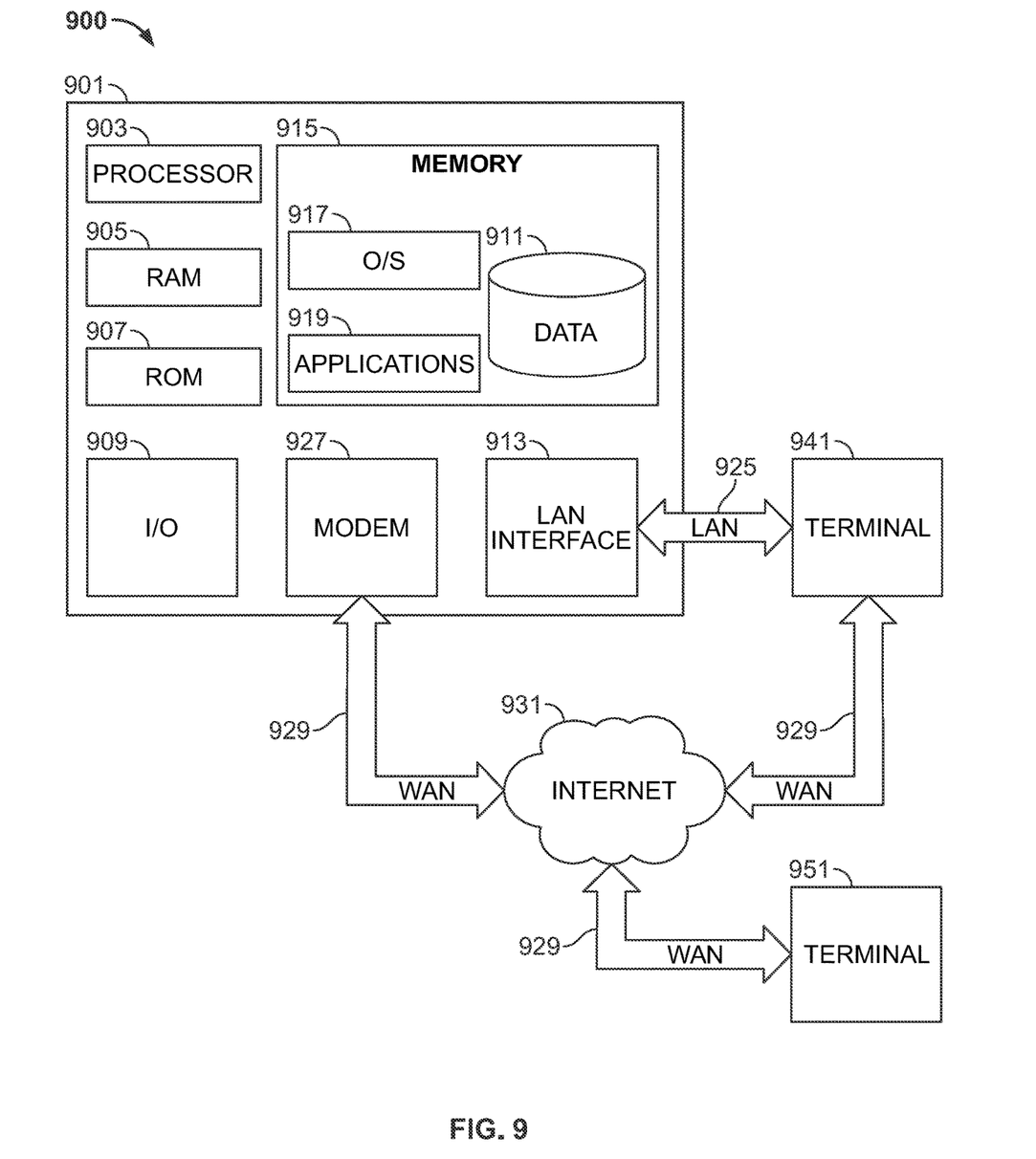
FIG. 9 shows an illustrative system architecture in accordance with principles of the disclosure.

FIG. 9 shows an illustrative block diagram of system 900 that includes computer 901. Computer 901 may alternatively be referred to herein as an "engine," "server" or a "computing device." Computer 901 may be any computing device described herein, such as the computing devices running on a computer, smart phones, smart cars, smart cards, and any other mobile device described herein. Elements of system 900, including computer 901, may be used to implement various aspects of the systems and methods disclosed herein.

System 900 may be implemented, for example, as a memory producer, a memory consumer, at a device associated with the memory for storing the log data by topic, as a device on which a user may perform troubleshooting based on the log data, or at other locations within the massive parallel processing environment.

Computer 901 may have a processor 903 for controlling the operation of the device and its associated components, and may include RAM 905, ROM 907, input/output circuit 909, and a non-transitory or non-volatile memory 915. Machine-readable memory may be configured to store information in machine-readable data structures. Other components commonly used for computers, such as EEPROM or Flash memory or any other suitable components, may also be part of the computer 901.

Memory 915 may be comprised of any suitable permanent storage technology—e.g., a hard drive. Memory 915 may store software including the operating system 917 and application(s) 919 along with any data 911 needed for the operation of computer 901. Memory 915 may also store videos, text, and/or audio assistance files. The data stored in Memory 915 may also be stored in cache memory, or any other suitable memory.

Input/output ("I/O") module 909 may include connectivity to a microphone, keyboard, touch screen, mouse, and/or stylus through which input may be provided into computer 801. The input may include input relating to cursor movement. The input/output module may also include one or more speakers for providing audio output and a video display device for providing textual, audio, audiovisual, and/or graphical output. The input and output may be related to computer application functionality.

Computer 901 may be connected to other systems via a local area network (LAN) interface 913. Computer 901 may operate in a networked environment supporting connections to one or more remote computers, such as terminals 941 and 951. Terminals 941 and 951 may be personal computers or servers that include many or all the elements described above relative to computer 901.

In some embodiments, computer 901 and/or Terminals 941 and 951 may be any of mobile devices that may be in electronic communication with consumer device 906 via LAN, WAN, or any other suitable short-range communication when a network connection may not be established.

When used in a LAN networking environment, computer 901 is connected to LAN 925 through a LAN interface 913 or an adapter. When used in a WAN networking environment, computer 901 may include a communications device, such as modem 927 or other means, for establishing communications over WAN 929, such as Internet 931.

In some embodiments, computer 901 may be connected to one or more other systems via a short-range communication network (not shown). In these embodiments, computer 901 may communicate with one or more other terminals 941 and 951, such as the mobile devices described herein etc., using a personal area network (PAN) such as Bluetooth®, NFC (Near Field Communication), ZigBee, or any other suitable personal area network.

It will be appreciated that the network connections shown are illustrative and other means of establishing a communications link between computers may be used. The existence of various well-known protocols such as TCP/IP, Ethernet, NFT, HTTP, and the like is presumed, and the system can be operated in a client-server configuration to permit retrieval of data from a web-based server or API (Application Programming Interface). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 919, which may be used by computer 901, may include computer executable instructions for invoking functionality related to communication, such as e-mail, Short Message Service (SMS), and voice input and speech recognition applications. Application program(s) 919 (which may be alternatively referred to herein as "plugins," "applications," or "apps") may include computer executable instructions for invoking functionality related to performing various tasks. Application programs 919 may use one or more algorithms that process received executable instructions, perform power management routines or other suitable tasks.

Application program(s) 919 may include computer executable instructions (alternatively referred to as "programs"). The computer executable instructions may be embodied in hardware or firmware (not shown). The computer 901 may execute the instructions embodied by the application program(s) 919 to perform various functions.

Application program(s) 919 may use the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 919 may include one or more algorithms that may be used to implement features of the disclosure.

The invention may be described in the context of computer-executable instructions, such as applications 919, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 901 and/or terminals 941 and 951 may also include various other components, such as a battery, speaker, and/or antennas (not shown). Components of computer system 901 may be linked by a system bus, wirelessly or by other suitable interconnections. Components of computer system 901 may be present on one or more circuit boards. In some embodiments, the components may be integrated into a single chip. The chip may be silicon-based.

Terminal 951 and/or terminal 941 may be portable devices such as a laptop, cell phone, Blackberry™, tablet, smartphone, or any other computing system for receiving, storing, transmitting and/or displaying relevant information. Terminal 951 and/or terminal 941 may be one or more user devices. Terminals 951 and 941 may be identical to computer 901 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smartphones, multiprocessor systems, microprocessor-based systems, cloud-based systems, programmable consumer electronics, network PCs, minicomputers, mainframe computers, distributed computing environments that include any of the above systems or devices, and the like.

Figure 10:
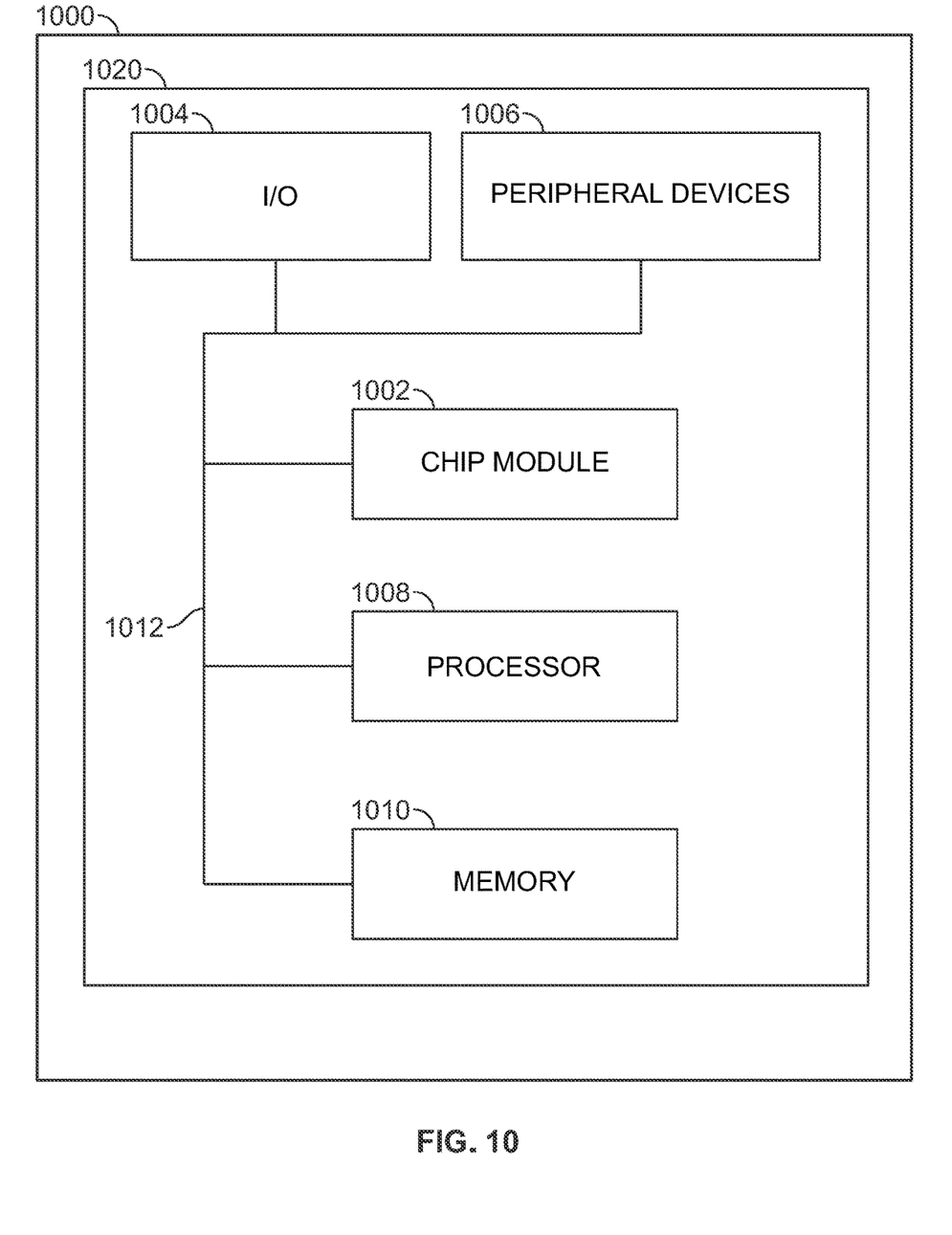
FIG. 10 shows an illustrative apparatus of a device in accordance with principles of the disclosure.

FIG. 10 shows illustrative apparatus 1000, which may be a computing device. Apparatus 1000 may include chip module 1002, which may include one or more integrated circuits, and which may include logic configured to perform any other suitable logical operations.

Apparatus 1000 may include one or more of the following components: I/O circuitry 1004, which may include a transmitter device and a receiver device and may interface with fiber optic cable, coaxial cable, telephone lines, wireless devices, PHY layer hardware, a keypad/display control device or any other suitable media or devices; peripheral devices 1006, which may include counter timers, real-time timers, power-on reset generators or any other suitable peripheral devices; logical processing device 1008, which may compute data structural information and structural parameters of the data; and machine-readable memory 1010.

Machine-readable memory 1010 may be configured to store in machine-readable data structures: machine executable instructions, (which may be alternatively referred to herein as "computer instructions" or "computer code"), applications such as applications 1019, signals, and/or any other suitable information or data structures.

Components 1002, 1004, 1006, 1008 and 1010 may be coupled together by a system bus or other interconnections 1012 and may be present on one or more circuit boards such as circuit board 1020. In some embodiments, the components may be integrated into a single chip. The chip may be silicon-based.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for non-invasive instrumentation and monitoring of a massive parallel processing environment may be provided. Persons skilled in the art will appreciate that the present invention can be practiced by other than the described embodiments, which are presented for purposes of illustration rather than of limitation.

What is claimed is:

1. A non-invasive system for monitoring and troubleshooting a massive parallel processing platform, comprising:
   a hardware processor coupled to a memory;
   a data transporter, executing on the hardware processor coupled to the memory, that is operable to transport first data from data sources to an edge node at a data lake comprising interconnected information technology resources;
   a data ingester, executing on the hardware processor coupled to the memory, that is operable to ingest second data outputted from the edge node before data elements of the ingested data are forwarded to the data lake;
   a first message producer, executing on the hardware processor coupled to the memory, located at the data transporter and operable to capture first log data generated by the data transporter and transmit the first log data from the data transporter to a memory to store, by topic, the captured first log data as a sequence of related events;
   a second message producer, executing on the hardware processor coupled to the memory, located at the data ingester and operable to capture second log data generated by the data ingester and transmit the second log data from the data ingester to the memory to store, by topic, the captured second log data with the first log data, wherein the captures of the first and second log data are performed non-invasively without interfering with current processes being performed on the first and second data in the massive parallel processing environment; and
   a message consumer, executing on the hardware processor coupled to the memory, in communication with the first and second message producers and operable to:
      receive the first log data and the second log data to output instrumentation data that indicates a real-time status of ongoing operations at the data transporter and the data ingester,
      enable interaction, by a user, with the instrumentation data to monitor and troubleshoot issues indicated by the instrumentation data.

2. The system of claim 1, wherein:
   the data transporter is operable to:
      receive a seed file, the seed file comprising a list of data elements from the data sources and a data source location for each data element included in the list of data elements;
      parse the seed file into a plurality of data elements and associated data source locations;
      retrieve the plurality of data elements from the data source locations; and
      transfer the retrieved data elements from the data source locations to the edge node at the data lake; and
   the data ingester is operable to:
      receive a schema configuration file for each of the data elements, the schema configuration file comprising field definitions, validation rules and mappings;
      convert a format of each of the data elements, located at the edge node at the data lake, from a native format to a data lake accessible format; and
      store each of the converted data elements at one or more locations the data lake based on the schema configuration file.

3. The system of claim 2, further comprising:
   a data chef, operating on the processor coupled to the memory, that is operable to:
      transform each of the stored data elements into integrated, conformed data elements; and
      execute one or more recipes on each of the stored data elements, the one or more recipes manipulating each of the data elements into consumable data elements that are specifically consumable by one or more downstream applications, the one or more recipes being received from one or more downstream applications; and
   a third message producer located at the data chef and operable to capture third log data for the data chef and transmit the third log data from the data chef to the memory to store, by topic, the third log data in addition to the first log data and the second log data;
   wherein the message consumer is further operable to receive the third log data captured by the third message producer.

4. The system of claim 3, wherein the edge node, the data lake, the data ingester and the data chef are located within a digital ecosystem comprising a Hadoop as a Service system.

5. The system of claim 3, further comprising a display that is operable to display one or more electronic dashboards for a user to monitor in real time a status of ongoing operations of the massive parallel processing platform based on the instrumentation data.

6. The system of claim 5, wherein the one or more electronic dashboards display in real time performance-related metrics that enable the user to monitor a real-time status of ongoing operations of the massive parallel processing platform and to troubleshoot in real time to performance issues that are detected.

7. The system of claim 6, wherein the one or more electronic dashboards comprise separate dashboards for each of the data transporter, the data ingester, and the data chef.

8. The system of claim 7, wherein the real-time status of the ongoing operations indicates success or failure of data transmission or exceptions as indicated in the first log data or the second log data.

9. The system of claim 8, wherein the real-time status of the ongoing operations indicates one or more of data load time, data load status, system performance compared to SLA (service level agreement) specifications, an SLA trend that shows an increase or decrease in system performance, or data growth.

10. The system of claim 1, wherein each topic is an Apache Kafka topic.

11. A method for monitoring and troubleshooting a massive parallel processing platform non-invasively, comprising:
    transporting first data from data sources to an edge node at a data lake using a data transporter, wherein the data lake comprises interconnected information technology resources;
    capturing, at a first message producer located at the data transporter, first log data generated by the data transporter as a first set of events;
    transmitting the first log data from the first message producer to a memory to store the captured first log data;
    ingesting second data outputting from the edge node at a data ingester before forwarding data elements of the ingested data to the data lake;

capturing, using a second message producer located at the data ingester, second log data generated by the data ingester as a second set of events, wherein the captures of the first and second log data are performed non-invasively without interfering with current processes being performed on the first and second data in the massive parallel processing environment;

transmitting the second log data from the second message producer to the memory to store the captured second log data;

storing the first log data with the second log data in the memory, by topic;

receiving, at a message consumer, instrumentation data that indicates a real-time status of ongoing operations at the data transporter and the data ingester, wherein the instrumentation data is based on the first log data and the second log data; and enabling interaction, by a user, with the instrumentation data to monitor and troubleshoot issues indicated by the instrumentation data.

12. The method of claim 11, wherein:

the transporting of the first data from the data sources to the edge node comprises:

receiving a seed file at the data transporter, the seed file comprising a list of data elements and a data source location for each data element included in the list of data elements;

parsing the seed file at the data transporter, the parsing comprising separating the seed file into a plurality of data elements and data source locations;

retrieving the plurality of data elements from the data source locations; and transferring, by the data transporter, the retrieved data elements from the data source locations to the edge node at the data lake; and the ingesting of the second data from the data sources to the edge node comprises:

receiving, at the data ingester located at the data lake, a schema configuration file for each of the data elements;

converting, at the data ingester, a format of each of the data elements, located at the edge node at the data lake, from a native format to a data lake accessible format; and storing, by the data ingester, the data elements at one or more locations at the data lake based on the schema configuration file.

13. The method of claim 11, further comprising:

transforming, at a data chef, third data that is processed in the data lake into consumable data that is consumable by one or more downstream applications;

capturing, by a third message producer located at the data chef, third log data for the data chef that indicates a status of operations at the data chef, and transmitting the third log data generated by the data chef to the memory to store by topic the third log data with the first and second log data; and wherein the instrumentation data that is received, at the message consumer, is further based on the third log data.

14. The method of claim 13, wherein the edge node, the data lake, the data ingester and the data chef are located within a digital ecosystem comprising a Hadoop as a Service system.

15. The method of claim 13, further comprising outputting for display on one or more electronic dashboards in real time a status of ongoing operations of the massive parallel processing platform based on the instrumentation data.

16. The method of claim 15, wherein the one or more electronic dashboards comprise separate dashboards for each of the data transporter, the data ingester, and the data chef.

17. The method of claim 16, wherein the one or more electronic dashboards display in real-time performance-related metrics that enable the user to monitor a real-time status of ongoing operations of the massive parallel processing platform and to troubleshoot in real time to performance issues that are detected.

18. The method of claim 17, wherein the real-time status of the ongoing operations indicates success or failure of data transmission or exceptions as indicated by the first and second log data.

19. The method of claim 18, wherein the real-time status of the ongoing operations indicates data load time, data load status, system performance compared to SLA (service level agreement) specifications, an SLA trend that shows an increase or decrease in system performance, or data growth.

20. The method of claim 11, wherein the topic is an Apache Kafka topic.

* * * * *